United States Patent
Oyafuso et al.

[11] Patent Number: 5,971,621
[45] Date of Patent: Oct. 26, 1999

[54] AXIAL SHAFT RETENTION DESIGN

[75] Inventors: Harry H. Oyafuso, Novi; William John Call, Belleville, both of Mich.

[73] Assignee: Ford Motor Company, Dearborn, Mich.

[21] Appl. No.: 09/072,009

[22] Filed: May 4, 1998

[51] Int. Cl.[6] .................................................. F16C 43/04
[52] U.S. Cl. ......................................... 384/539; 384/903
[58] Field of Search .................................. 384/537, 538, 384/539, 559, 561, 570, 584, 585, 903; 403/326, 327, 328

[56] References Cited

U.S. PATENT DOCUMENTS

| | | | |
|---|---|---|---|
| Re. 32,846 | 1/1989 | Sandberg et al. | 403/326 X |
| 2,607,642 | 8/1952 | Gilbert | 384/539 |
| 4,563,099 | 1/1986 | Brandenstein et al. | 384/537 X |
| 4,822,228 | 4/1989 | Senft et al. | 403/326 X |
| 5,015,897 | 5/1991 | Inagaki et al. | 310/83 |
| 5,089,736 | 2/1992 | Oyafuso | 384/903 X |
| 5,408,897 | 4/1995 | Klinar | 384/537 X |
| 5,505,547 | 4/1996 | Kodaira | 384/537 |
| 5,681,118 | 10/1997 | Armstrong et al. | 384/536 X |

FOREIGN PATENT DOCUMENTS

| | | | |
|---|---|---|---|
| 399384 | 7/1924 | Germany | 384/537 |
| 205816 | 10/1959 | Germany | 384/585 |
| 927889 | 6/1963 | United Kingdom | 384/903 |

*Primary Examiner*—Thomas R. Hannon
*Attorney, Agent, or Firm*—Mark S. Sparschu

[57] ABSTRACT

An apparatus for axially retaining a shaft comprises a shaft having an axis of rotation and an axially-affixed member having a bore therethrough coaxial with the shaft and having an inside diameter, the shaft passing through the bore. The apparatus also includes a retainer mounted about the shaft in a first groove, the retainer having an outside diameter larger than the diameter of the bore. The apparatus further comprises a retaining ring mounted about the shaft in a second groove, the retaining ring having a compressed outside diameter less than the inside diameter of the bore and an uncompressed outside diameter larger than the diameter of the bore. The first groove and the second groove are located on first and second axial sides of the member, respectively, and the retainer and the retaining ring cooperate to substantially prevent axial movement of the shaft with respect to the member. A method for assembling an apparatus having a shaft comprises placing a retaining ring about the shaft in a groove. The method further includes pushing the shaft through a bore of a member in a first axial direction with the retaining ring compressed to an outside diameter less than or equal to a diameter of the bore. Also, the method comprises continuing to push the shaft through the bore until the retaining ring emerges from the bore and expands sufficiently to prevent the shaft moving in the opposite axial direction from the first axial direction.

7 Claims, 2 Drawing Sheets

AXIAL SHAFT RETENTION DESIGN

BACKGROUND OF THE INVENTION

1. Field of the Invention

The present relates to axial retention for the shaft of an apparatus.

2. Description of the Related Art

When a shaft of an apparatus, for example a rotating shaft, is to be affixed against axial movement, one known design uses a pair of retaining clips. Where the shaft passes through an axially-affixed member, such as a bearing, one retaining clip can be inserted in a groove of the shaft on one side of the bearing and the other retaining clip can be inserted in a groove on the other side of the bearing.

While such a design is certainly effective in axially affixing the shaft, the design has a shortcomings. The design allows only one clip to be placed on the shaft before the shaft is inserted through the bearing. Only then can the second clip be placed in its appointed groove in the shaft. However, once the shaft has been inserted through the bearing, the process of placing the second clip in its appointed groove can be difficult. This is especially true where there is not ready access to the side of the bearing where the second clip is to be placed on the shaft. The result can be a design which is very difficult to build or, at the worst, unmanufacturable.

Therefore, a design where a shaft can be affixed against axial movement in a manner which is more readily manufactured will provide advantages over the prior art.

SUMMARY OF THE INVENTION

The present invention provides an apparatus for axially retaining a shaft. The apparatus comprises a shaft having an axis of rotation and an axially-affixed member having a bore therethrough coaxial with the shaft and having an inside diameter, the shaft passing through the bore. The apparatus also includes a retainer mounted about the shaft in a first groove, the retainer having an outside diameter larger than the diameter of the bore. The apparatus further comprises a retaining ring mounted about the shaft in a second groove, the retaining ring having a compressed outside diameter less than the inside diameter of the bore and an uncompressed outside diameter larger than the diameter of the bore. The first groove and the second groove are located on first and second axial sides of the member, respectively, and the retainer and the retaining ring cooperate to substantially prevent axial movement of the shaft with respect to the member.

The present invention also provides a method for assembling an apparatus having a shaft. The method comprises placing a retaining ring about the shaft in a groove. The method further includes pushing the shaft through a bore of a member in a first axial direction with the retaining ring compressed to an outside diameter less than or equal to a diameter of the bore. Also, the method comprises continuing to push the shaft through the bore until the retaining ring emerges from the bore and expands sufficiently to prevent the shaft moving in the opposite axial direction from the first axial direction.

Designs according to the present invention can provide axial shaft retention in a manner which is easier to manufacture than alternative designs. In doing so, the present invention provides advantages over the prior art.

DETAILED DESCRIPTION OF THE PREFERRED EMBODIMENT

Figure 1:
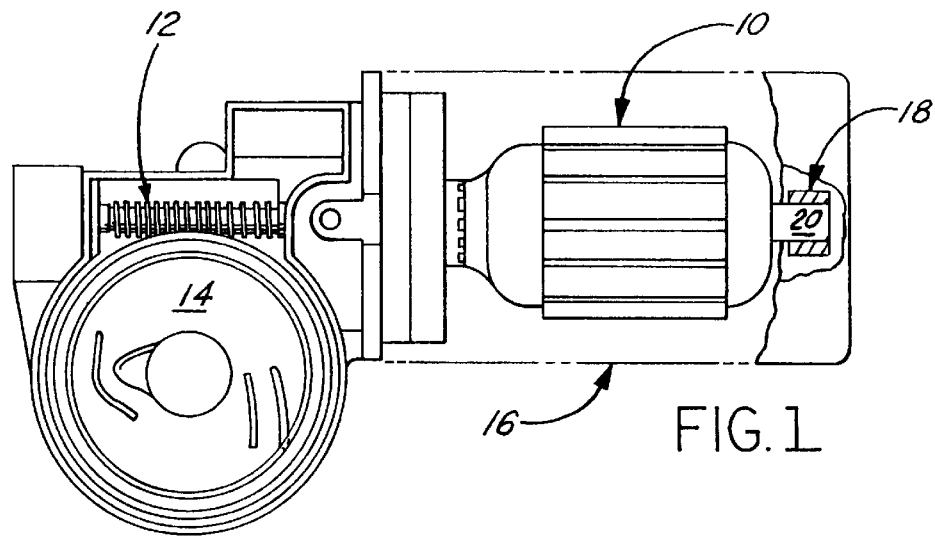
FIG. 1 is an illustration of a motor assembly for a windshield wiper assembly.

Refer first to FIG. 1, where a motor for a windshield wiper system is illustrated. The motor includes an armature 10 having a shaft on which is mounted a worm 12, mated with a worm gear 14. Extending into the paper from the center of worm gear 14 and not visible in FIG. 1 is an output shaft which provides rotational input to drive the windshield wipers. A cover 16 covers armature 10, includes permanent magnets (not shown) disposed about armature 10 and includes a bushing 18 to support shaft 20 of armature 10. A suitable cover (not shown) covers and protects worm gear 14.

Figure 2:
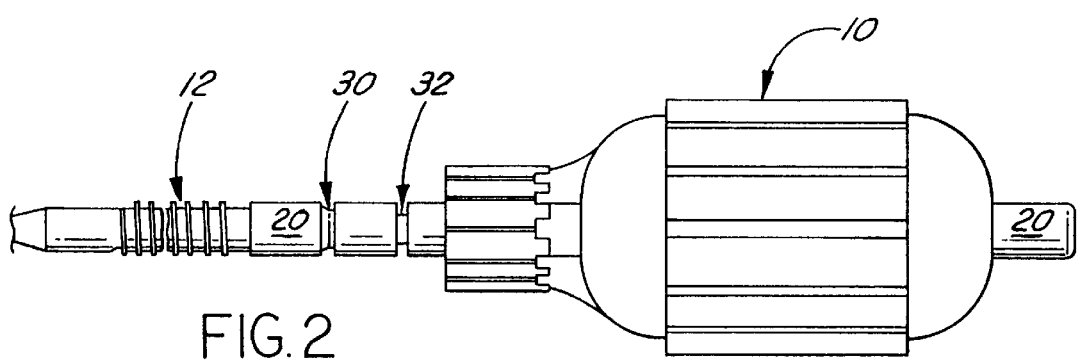
FIG. 2 is an illustration of armature assembly 10 of the motor assembly of FIG. 1.

Referring additionally to FIG. 2, armature 10 includes a shaft 20 which has first groove 30 and second groove 32. In the final assembly of the motor, grooves 30 and 32 each contain a member which together axially affix armature 10.

The process of axially affixing armature 10 begins with a first split ring 40 (see FIGS. 4A and 4B) being placed about shaft 20 in groove 30 and a spring clip 42 being placed about shaft 20 in groove 32. A tapered ring compressor 43 (see FIGS. 5A and 5B) is also placed about shaft 20, with its larger end adjacent split ring 40.

Figure 3A:
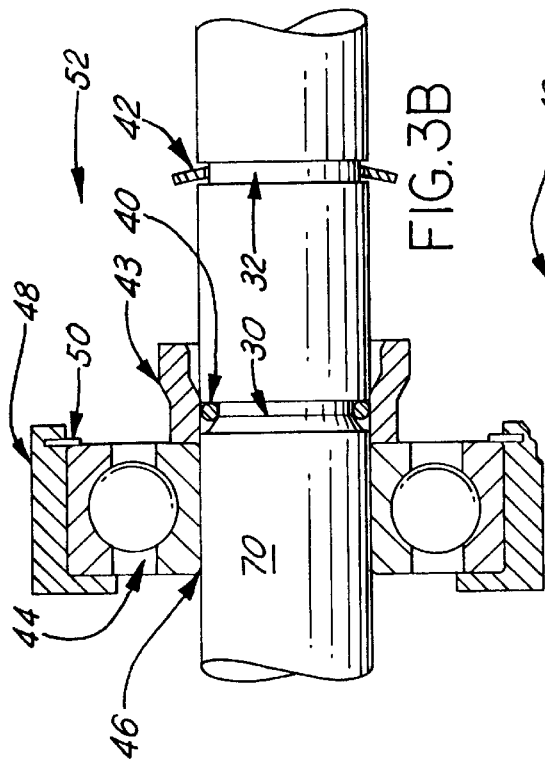
FIGS. 3A–3D are four views illustrating the assembly of armature assembly 10 into the motor assembly of FIG. 1.
Figure 3B:
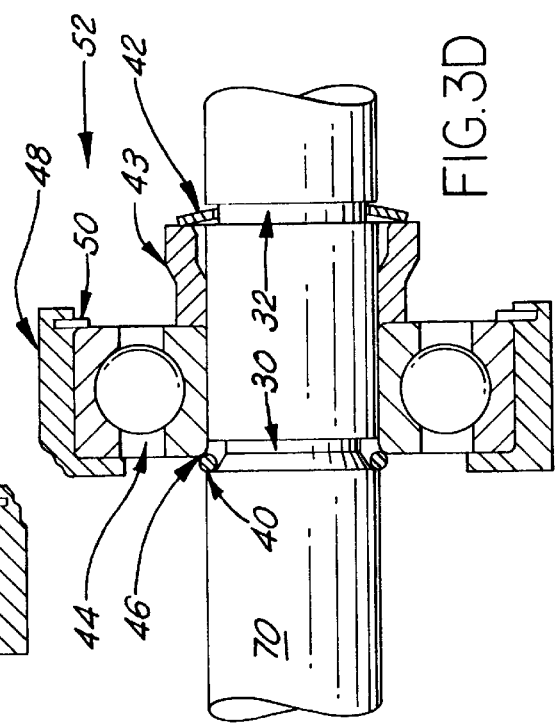
Figure 3C:
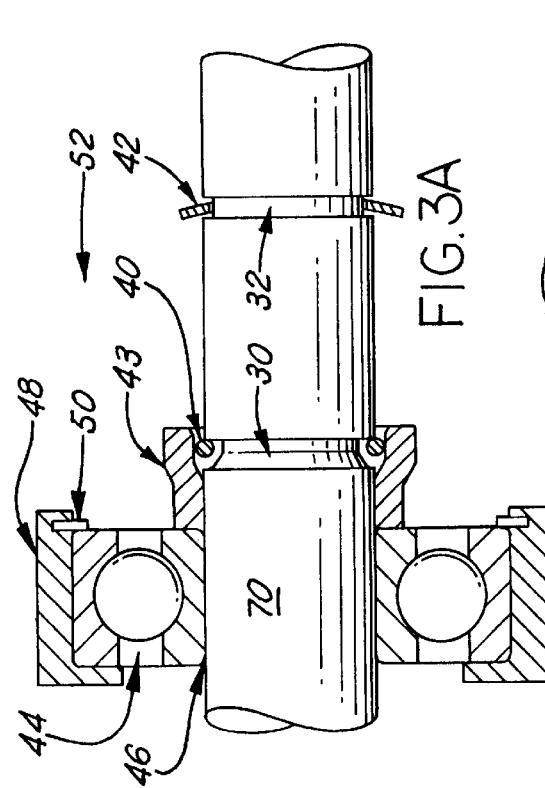
Figure 3D:
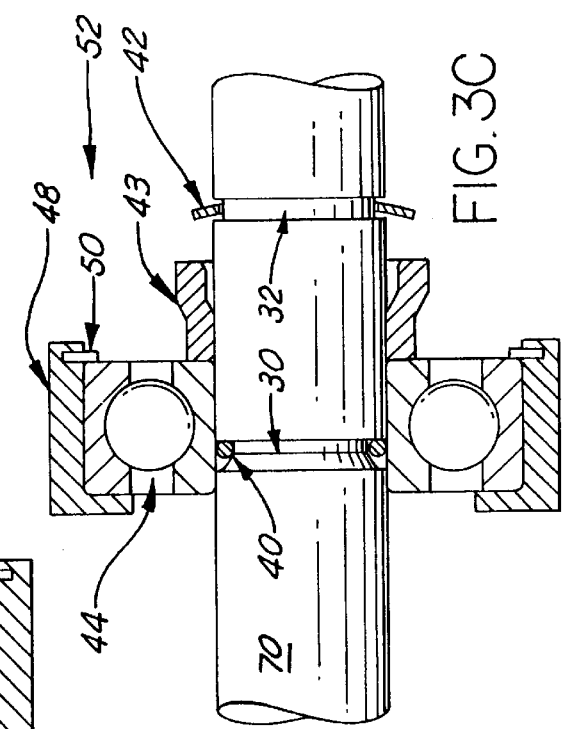

Refer now additionally to FIGS. 3A–3D, where assembly of the motor is illustrated. (A bearing 44 having a central bore 46 has already been affixed to the frame 48 of the motor using a snap ring 50.) In FIG. 3A, shaft 20 is pushed into bore 46 in the direction of arrow 52 such that ring compressor 43 begins to compress split ring 40. In FIG. 3B, shaft 20 continues to be pushed into bore 46 such that split ring 40 is compressed to a diameter smaller than the inside diameter of bore 46 of bearing 44. In FIG. 3C, shaft 20 continues to be pushed into bore 46 with split ring 40 now within bore 46. Finally, in FIG. 3D, split ring 40 has emerged from bore 46 and expands sufficiently to prevent shaft 20 from moving back in the axial direction opposite that of arrow 52. At this point, spring clip 42 abuts against ring compressor 43. Thus, shaft 20 is substantially axially affixed by split ring 40 and spring clip 42.

Figure 4A:
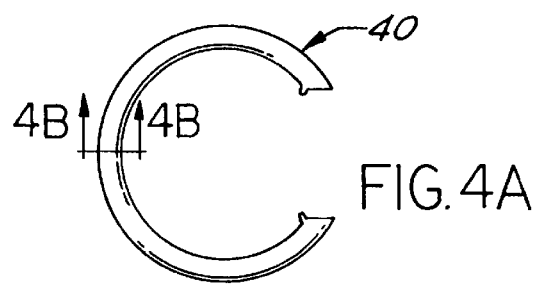
FIG. 4A is a side view of split ring 40 of FIGS. 3A–3D.
Figure 4B:
FIG. 4B is a sectional view of split ring 40 taken along line 4B—4B of FIG. 4A.

Refer additionally to FIGS. 4A and 4B, two views of split ring 40. As the discussion to this point has indicated, split ring 40 must have an uncompressed outer diameter greater than the inner diameter of bore 46. Thus, when split ring 40 emerges after shaft 20 is inserted into bore 46, split ring 40 can expand to prevent shaft 20 from thereafter being retracted. Also, split ring 40 must have a compressed outer diameter less than the inner diameter of bore 46. Split ring 40 can thus be compressed sufficiently to allow it to pass through bore 46. Split ring 40 is preferably made of steel.

Figure 5A:
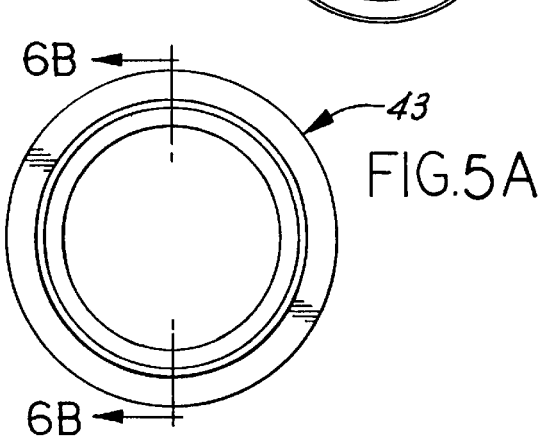
FIG. 5A is a front view of tapered ring compressor 43 of FIGS. 3A–3D.
Figure 5B:
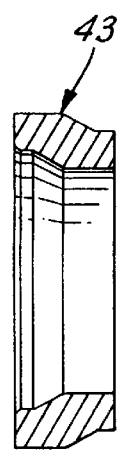
FIG. 5B is a sectional view of tapered ring compressor 43 taken along line 5B—5B of FIG. 5A.

Refer additionally to FIGS. 5A and 5B. There, tapered ring compressor 43 is illustrated in detail. Tapered ring compressor 43 is preferably made from steel.

Spring clip 42 (see FIGS. 3A–3D) is preferably a standard "E"-clip made of spring steel and designed to be retained securely in groove 32.

Review of FIGS. 3A–3D will indicate that groove 30 of shaft 20 is not a square groove. Groove 30 is tapered from a larger outside diameter at the left in FIGS. 3A–3D to a smaller outside diameter at the right. This design helps split ring 40 easily compress as it passes through bore 46 and yet expand back to its uncompressed outer diameter to retain shaft 20 after split ring 40 has passed through bore 46.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An apparatus for axially retaining a shaft, said apparatus comprising:

a shaft having an axis of rotation;

an axially-affixed member having a bore therethrough coaxial with said shaft and having an inside diameter, said shaft passing through said bore;

a retainer mounted about said shaft in a first groove, said retainer having an outside diameter larger than said diameter of said bore;

a retaining ring mounted about said shaft in a second groove, said retaining ring having a compressed outside diameter less than said inside diameter of said bore and an uncompressed outside diameter larger than said diameter of said bore; wherein said first groove and said second groove are located on first and second axial sides of said member, respectively, and said retainer and said retaining ring cooperate to substantially prevent axial movement of said shaft with respect to said member.

2. An apparatus as recited in claim 1, wherein:

said second groove is tapered to have a first portion with a diameter such that with said retaining ring compressed to reside in said first portion, said retaining ring has an outside diameter less than said diameter of said bore; and a second portion having a second diameter such that with said retaining ring residing in said second portion, said second retaining ring has an outside diameter greater than said diameter of said bore; and said retaining ring is located in said second portion of said bore.

3. An apparatus as recited in claim 2, further comprising a tapered ring compressor mounted about said shaft on said first axial side of said member, said ring compressor having a first end with a diameter greater than said uncompressed outside diameter of said retaining ring and a second end with a diameter less than said diameter of said bore.

4. An apparatus as recited in claim 3, wherein said retainer abuts against said first end of said ring compressor and said second end of said ring compressor abuts against said member.

5. An apparatus as recited in claim 4, wherein said member is a bearing.

6. An apparatus as recited in claim 5, wherein said retaining ring has a round cross section.

7. An apparatus as recited in claim 2, wherein said retaining ring has a round cross section.

* * * * *